C. KRIEG.
WATER METER.
APPLICATION FILED JAN. 24, 1916.

1,245,740.

Patented Nov. 6, 1917.
3 SHEETS—SHEET 2.

WITNESS

INVENTOR
Conrad Krieg
BY
Redding Greeley Goodlet
ATTORNEYS

C. KRIEG.
WATER METER.
APPLICATION FILED JAN. 24, 1916.
1,245,740.
Patented Nov. 6, 1917.
3 SHEETS—SHEET 3.
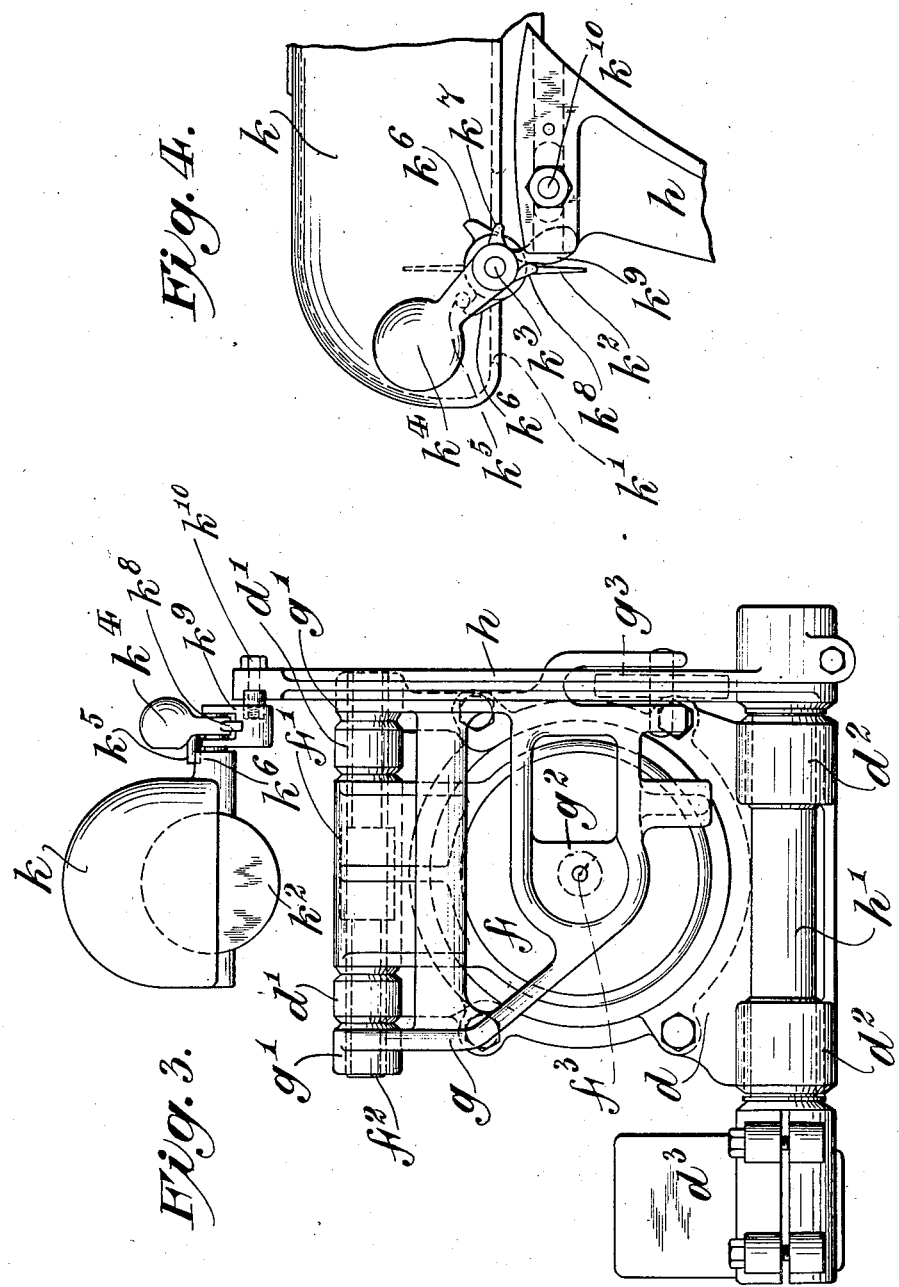

UNITED STATES PATENT OFFICE.

CONRAD KRIEG, OF BROOKLYN, NEW YORK, ASSIGNOR TO NEPTUNE METER COMPANY, OF NEW YORK, N. Y., A CORPORATION OF NEW JERSEY.

WATER-METER.

1,245,740.  Specification of Letters Patent.  Patented Nov. 6, 1917.

Application filed January 24, 1916. Serial No. 73,819.

*To all whom it may concern:*

Be it known that I, CONRAD KRIEG, a citizen of the United States, and residing in the borough of Brooklyn of the city of New York, county of Kings, in the State of New York, have invented certain new and useful Improvements in Water-Meters, of which the following is a specification, reference being had to the accompanying drawings, forming a part hereof.

This invention relates to water-meters which present a high-duty straight-flow unobstructed passage from inlet to outlet, with a valve to close the same under conditions of normal flow, a low-duty passage from inlet to outlet, with a valve to close the same under conditions of high-duty flow, a proportional metering device for high-duty flow at one side of the path of straight-flow, and a separate metering device for low-duty flow. The object of the invention is generally to improve the construction and operation of such meters, with a view to securing accuracy of registration under all conditions of use. One special object of the invention is to provide means whereby, under high-duty conditions, the flow through the proportional metering device shall be induced by the main flow, thereby securing a truer proportion under all conditions than when means are provided near the inlet to deflect through the proportional metering device a portion of the total flow. Another object of the invention is to provide means whereby an instantaneous opening and an instantaneous closing of the high-duty valve shall be assured, so that there shall be less opportunity for uncertain registration by the proportional meter than when the high-duty valve opens gradually. Still another object of the invention is to improve the means whereby the high-duty valve, in its opening and closing movements, is caused to close and open the low-duty valve. The invention will be more fully explained hereinafter with reference to the accompanying drawings, in which it is illustrated as embodied in an approved structure and in which,—

Fig. 3 is a detail view in elevation as seen from the left hand in Fig. 1, but on a larger scale, showing particularly the means for supporting and operating the high-duty valve and the means whereby the movement of the high-duty valve actuates the low-duty valve.

Fig. 4 is a detail view in elevation, as seen from the right hand in Fig. 3, but on a still larger scale, showing particularly the device for actuating the low-duty valve.

Figure 2:
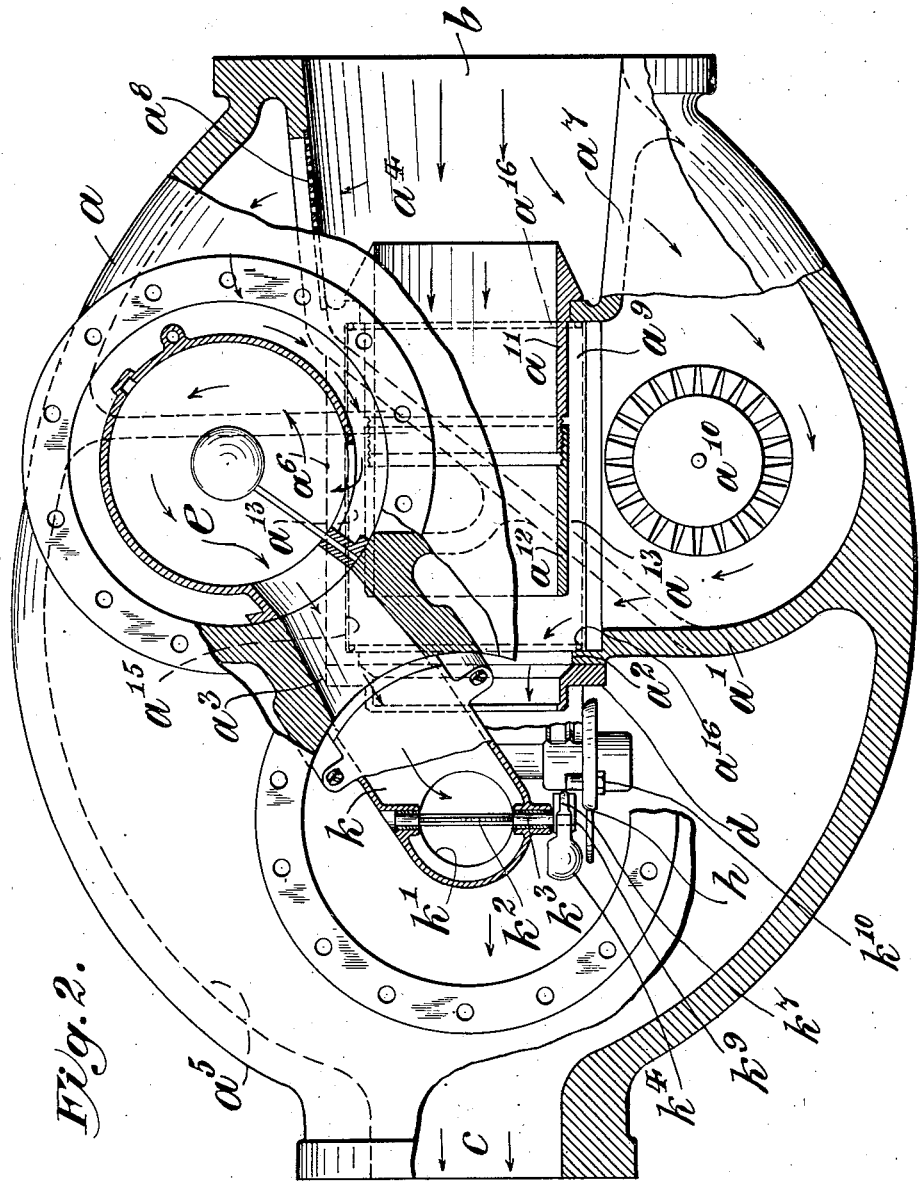
Fig. 2 is a view of the same partly in horizontal section on different planes.

The casing $a$, having an inlet $b$ and an outlet $c$, is shown as having a transverse wall $a'$ which is provided with a high-duty orifice $a^2$ in a straight line with the inlet and the outlet and of substantially the same area, and with a low-duty orifice $a^3$ at one side of the straight flow path. The wall $a'$ forms on one side an inlet chamber $a^4$ and on the other side a discharge chamber $a^5$. A cylindrical shell $a^6$ is carried from the wall $a'$ toward the inlet and the wall of the shell is continued from the forward end of the cylindrical portion to the inlet with ports $a^7$ and $a^8$ for the proportional flow and low-duty flow respectively. The cylindrical shell $a^6$ is provided on one side with a port $a^9$ which preferably extends throughout the length of the cylindrical portion and permits the proportional flow, which, under high-duty conditions, passes through the proportional metering device $a^{10}$, of ordinary construction, to enter the space within the cylindrical shell $a^6$ throughout its length. A sleevelike nozzle, consisting preferably of two relatively adjustable parts $a^{11}$ and $a^{12}$, which may be threaded together, as clearly shown in Fig. 2, is supported within the cylindrical shell $a^6$ and terminates a short distance in front of the high-duty orifice $a^2$. The external diameter of the nozzle $a^{11}$, $a^{12}$ is less than the internal diameter of the cylindrical sleeve $a^6$, so that there is formed around the sleevelike nozzle an annular chamber $a^{13}$, into which the water from the proportional meter passes throughout its length and from which it passes in an annular envelop around the terminal end of the nozzle $a^{11}$, $a^{12}$ and thence, with the main flow through such nozzle, into the orifice $a^2$ and the discharge chamber $a^5$.

The structure constitutes a sort of jet-pump or aspirator so that the main flow through the nozzle $a^{11}$, $a^{12}$, under high-duty conditions, when the high-duty valve is open, acts upon the surrounding envelop of water, which communicates with the inlet through the proportional metering device $a^{10}$, and induces a flow which will be always in proportion to the main flow. The aspirating action may be varied somewhat by varying the distance between the end of the nozzle $a^{11}$, $a^{12}$ and the orifice $a^2$, and for this purpose the section $a^{12}$ is made adjustable with respect to the section $a^{11}$, as shown in Fig. 2.

Figure 1:
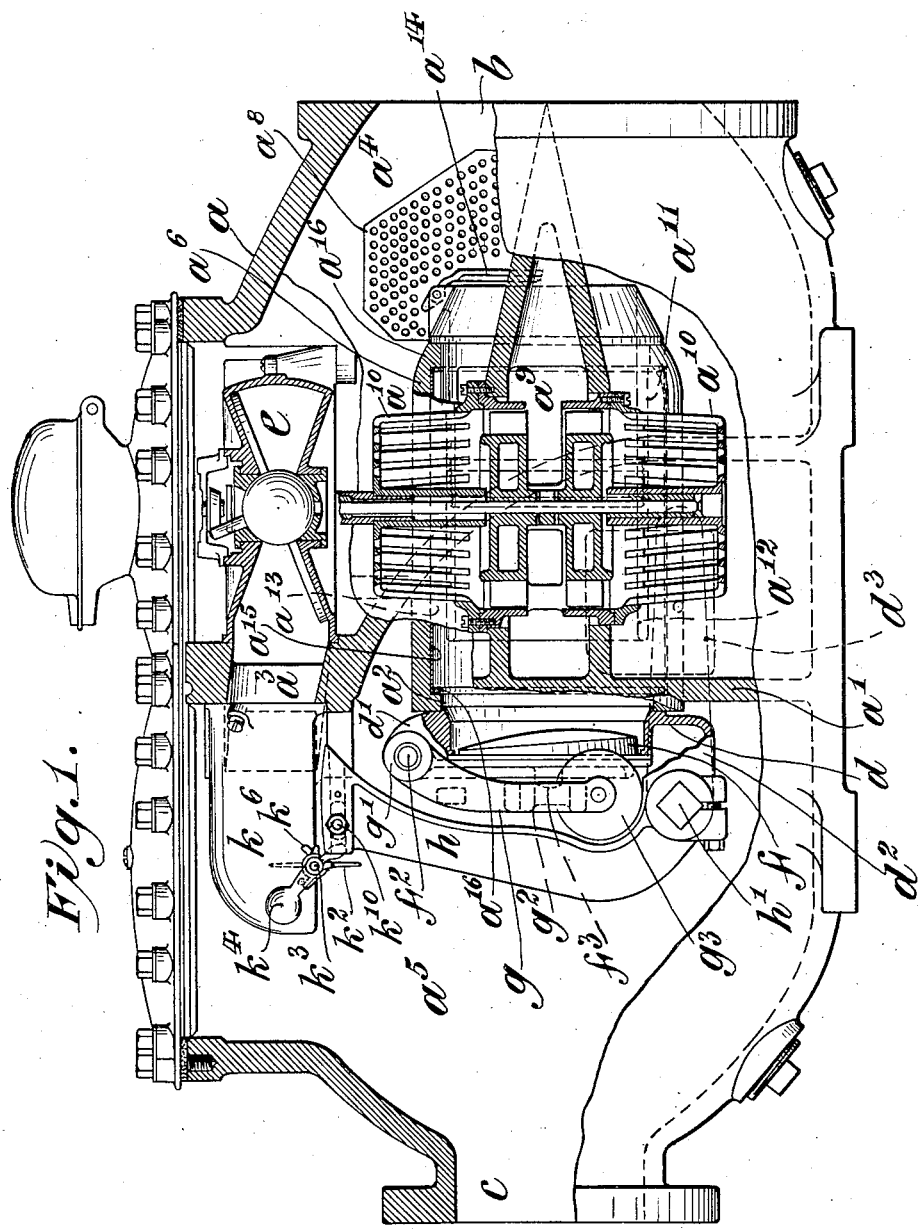
Figure 1 is a view partly in longitudinal section and partly in elevation of a meter which embodies the invention, the plane of section through the low-duty metering device being more remote from the eye than the plane of section through the high-duty metering device.

A flap valve or deflector $a^{14}$ may be pivoted at the inlet end of the nozzle, as shown in Fig. 1, but it is relied upon rather to reduce slightly the flow through the nozzle and therefore increase slightly the velocity of such flow, so as to increase the aspirating action, than to deflect any part of the flow through the proportional meter.

For the purpose of preventing corrosion of the interior of the sleeve $a^6$, since such corrosion would affect the flow through the annular space, a lining $a^{15}$, of non-corrodible metal, such as copper, is provided for the sleeve and, being divided throughout its length in registration with the port $a^9$, may be held in place by spring-rings $a^{16}$ at its ends.

Secured to the wall $a'$ and having an opening to register accurately with the orifice $a^2$, is a casting $d$ supporting and forming a seat for the high-duty valve $f$ which is opened by such high pressure differential as may be caused by the opening of a fire hydrant, and closes when conditions of normal flow are restored. To secure accuracy of registration it is very desirable that the opening and closing of the valve $f$ be instantaneous, that is, that the opening or the closing, as the case may be, shall be uniform all around the perimeter of the valve and shall not begin at one part of the perimeter and be followed through the remainder of the perimeter. The valve is closed and is held normally closed by the action of a weight through suitable intermediate connections. It is found that when the pressure of the weight is exercised at one side of the valve, as is usually the case, the opening of the valve begins at the part of the perimeter remote from the point of pressure of the weight and that the closing begins at that part of the perimeter nearest the point of pressure. One object of the invention is therefore to enable the pressure of the weight to be exerted centrally against the valve, so that there shall be no tendency to open or close first one part or another of the perimeter. The valve $f$, being suitably shaped, as heretofore, to permit simultaneous opening at all points of the perimeter, notwithstanding its swinging movement, is hung by a wide arm $f'$ from a horizontal shaft $f^2$ which is supported in bearings $d'$ carried by the frame or casting $d$, above the opening. An independent, rigid frame $g$ is also hung at two points on the extremities of the shaft $f^2$, as at $g'$, and is provided with a bearing plate $g^2$ for coöperation with a central stud $f^3$ on the rear face of the valve $f$. A roller $g^3$ is mounted in the frame, at one side of the valve, to coöperate with the usual cam-arm $h$ which is secured to one end of the shaft $h'$, mounted in bearings $d^2$ on the lower end of the frame or casting $d$. On the other end of the shaft $h'$ is secured the weighted arm $d^3$ which, through the pressure of the cam-arm $h$ against the roller $g^3$, holds the valve $f$ to its seat under normal conditions of flow. Under abnormal conditions of flow, when the pressure differential is increased above the normal, the pressure of the water against the valve $f$ forces the valve in the direction of flow against the resistance of the weight which is transmitted through the cam-arm $h$ and frame $g$ to the valve at its central point. The valve therefore leaves its seat at all points of its perimeter simultaneously and there is no tendency to open at one part of the perimeter earlier than at another.

Under normal conditions of flow the water flows from the inlet chamber $a^4$ through the port $a^8$, the low-duty metering device $e$, the port $a^3$ and the hood or casing $k$ to the discharge chamber $a^5$. The floor of the casing $k$ has an orifice $k'$ in which is mounted a butterfly valve $k^2$. This valve is open when the high-duty valve $f$ is closed, and is closed when the high-duty valve is open. It is desirable that the low-duty valve be closed before the high-duty valve is actually opened in order that the full pressure of the water may then be exerted upon the high-duty valve to open it, and that the low-duty valve is opened before the complete closing of the high-duty valve in order to relieve the high-duty valve of pressure and permit it to close quickly. The movement of the high-duty valve $f$ is caused, through the movement of the cam-arm $h$, to open and close the low-duty valve as the case may be. In order that the opening and closing of the low-duty valve may be properly timed with respect to the opening and closing of the high-duty valve, the following improved devices whereby the movement of the cam-arm $h$ is made to actuate the valve $k^2$ are provided: The valve $k^2$ is mounted on a shaft $k^3$ which has bearings in the sides of the casing $k$. On the end of the shaft is fixed a weighted arm $k^4$ which carries a pin $k^5$ to engage one or another of two stops $k^6$ to limit the swinging movement of the shaft and therefore of the valve $k^2$ in its open or its closed position. The hub of the weighted arm $k^4$ also has two lugs $k^7$ and $k^8$. Mounted loosely on the shaft is the U-shaped trip lever $k^9$, the bridge of which is adapted to engage one or the other of the lugs $k^7$, $k^8$, while the lower part of the lever is adapted to be engaged by a stud $k^{10}$ on the cam-arm $h$. With the parts in the position shown in Fig. 1 it will be seen that in the movement of the arm $h$ with the opening of the valve $f$ the stud $k^{10}$, in the beginning of its movement, engages the trip lever $k^9$, causing it to swing on the shaft $k^3$, and that the trip lever immediately engages the lug $k^8$ and rocks the shaft $k^3$, causing the weighted arm $k^4$ to pass from one side to the other of the vertical line through the axis, so that the weighted arm completes the closing movement of the valve $k^2$ and holds it closed while the valve $f$ is open. The valve $k^2$ is thus closed before the valve $f$ actually opens. During the closing movement of the valve $f$ the stud $k^{10}$, which passes beyond the freely swinging trip lever $k^9$ in its opening movement engages the trip lever on the other side in its closing movement and, before the valve $f$ is completely closed, moves the trip lever $k^9$ against the lug $k^7$ and therefore rocks the shaft to open the valve $k^2$ carrying the weighted arm $k^4$ from one side to the other of the vertical line through the axis, so that the weighted arm completes quickly the opening movement of the valve and holds it open while the valve $f$ is closed.

The mode of operation of the improved meter as a whole will be readily understood without further explanation. It will also be understood that various changes in details of construction and arrangement may be made without departing from the spirit of the invention.

I claim as my invention:

1. The combination of a meter casing having an inlet chamber, a discharge chamber and a transverse wall with an orifice therethrough, a cylindrical extension from said wall registering with said orifice and having a longitudinal port in one side thereof, a sleevelike nozzle within said cylindrical extension, smaller in diameter than said extension and terminating short of the wall, an annular chamber being formed about said nozzle and communicating with said orifice, and a proportional metering device between the inlet chamber and the port of the cylindrical extension.

2. The combination of a meter casing having an inlet chamber, a discharge chamber and a transverse wall with an orifice therethrough, a valve to close said orifice, a cylindrical extension from said wall registering with said orifice and having a longitudinal port in one side thereof, a sleevelike nozzle within said cylindrical extension smaller in diameter than said extension and terminating short of the wall, an annular chamber being formed about said nozzle and communicating with said orifice, and a proportional metering device between the inlet chamber and the port of the cylindrical extension.

3. The combination of a meter casing having an inlet chamber, a discharge chamber and a transverse wall with an orifice therethrough, a valve to close said orifice, a low-duty metering device interposed between the inlet chamber and the discharge chamber, a valve to control the passage of water through the low-duty metering device, a cylindrical extension from said wall registering with said orifice and having a longitudinal port in one side thereof, a sleevelike nozzle within said cylindrical extension, smaller in diameter than said extension and terminating short of the wall, an annular chamber being formed about said nozzle and communicating with said orifice, and a proportional metering device between the inlet chamber and the port of the cylindrical extension.

4. The combination of a meter casing having an inlet chamber, a discharge chamber and a transverse wall with an orifice therethrough, a cylindrical extension from said wall registering with said orifice and having a longitudinal port in one side thereof, a sleevelike nozzle within said cylindrical extension, smaller in diameter than said extension and terminating short of the wall, an annular chamber being formed about said nozzle and communicating with said orifice, said sleevelike nozzle being adjustable in length to vary the distance between its end and said wall, and a proportional metering device between the inlet chamber and the port of the cylindrical extension.

5. The combination of a meter casing having a transverse wall with an orifice therethrough, a swinging valve hung by a wide arm to control said orifice and having a central boss, a swinging frame hung from two widely separated points on the same axis with the valve and bearing against its central boss, a roller mounted on said frame at one side thereof, a lever bearing against said roller, and a weighted arm connected with said lever to cause it to bear against said roller.

6. The combination of a meter casing having a transverse wall with an orifice therethrough, a frame secured to said wall and having an opening to register with said orifice, a shaft mounted in bearings in said frame above the opening, a valve hung from said shaft to control said orifice and having a central boss, a frame hung from said shaft at its ends and bearing against the central boss of the valve, a roller mounted in said frame at one side thereof, a lever bearing against said roller, and a weighted arm connected to said lever to cause the same to bear against said roller.

7. The combination of a meter casing having an inlet chamber, a discharge chamber and a transverse wall with a high-duty orifice and a low-duty orifice therethrough, a valve to control said high-duty orifice, an arm moving with said valve in its opening and closing movements, a valve to control the low-duty orifice, a weighted arm moving with said valve and having two projecting lugs, and a trip lever swinging loosely on the same axis with the valve, engaged by said arm in its opening and closing movements, and engaging one or the other of said lugs as it is moved by said arm to rock the valve.

8. The combination of a meter casing having an inlet chamber, a discharge chamber, and a transverse wall with a high-duty orifice and a low-duty orifice therethrough, a valve to control said high-duty orifice, an arm moving with said valve in its opening and closing movements, a butterfly valve to control the low-duty orifice, a shaft on which the valve is mounted, a weighted arm fixed to said shaft and having two projecting lugs, and a trip lever mounted loosely on said shaft engaged by said arm in its opening and closing movements and engaging one or the other of said lugs as it is moved by said arm to rock the valve shaft.

This specification signed this 22d day of January, A. D. 1916.

CONRAD KRIEG.